(12) United States Patent
Pacenti (10) Patent No.: US 9,764,792 B2
(45) Date of Patent: Sep. 19, 2017

(54) BICYCLE HANDLEBAR, STEM, AND FORK ARRANGEMENT

(71) Applicant: Kirk A Pacenti, Chattanooga, TN (US)

(72) Inventor: Kirk A Pacenti, Chattanooga, TN (US)

( * ) Notice: Subject to any disclaimer, the term of this patent is extended or adjusted under 35 U.S.C. 154(b) by 102 days.

(21) Appl. No.: 14/670,772

(22) Filed: Mar. 27, 2015

(65) Prior Publication Data

US 2016/0280309 A1  Sep. 29, 2016

Related U.S. Application Data

(60) Provisional application No. 62/009,355, filed on Jun. 9, 2014, provisional application No. 61/971,065, filed on Mar. 27, 2014.

(51) Int. Cl.
*B62K 21/12* (2006.01)
*B62K 21/18* (2006.01)

(52) U.S. Cl.
CPC .............. *B62K 21/18* (2013.01); *B62K 21/12* (2013.01)

(58) Field of Classification Search
CPC ................................. B62K 21/18; B62K 21/12
See application file for complete search history.

(56) References Cited

U.S. PATENT DOCUMENTS

| | | | | |
|---|---|---|---|---|
| 379,258 A * | 3/1888 | Torkelson | ............. | B62K 21/18 188/27 |
| 2,357,553 A * | 9/1944 | Schwinn | ............. | B62K 21/12 403/213 |
| 3,722,930 A | 3/1973 | Humlong | | |
| 4,032,168 A * | 6/1977 | Emerson | ............. | B62K 11/14 280/279 |
| 4,043,688 A * | 8/1977 | Humlong | ............. | B62K 21/22 403/191 |
| 5,226,341 A * | 7/1993 | Shores | ............. | B62H 5/00 224/420 |
| 5,570,614 A * | 11/1996 | Nastrucci | ............. | B62K 21/125 280/279 |
| 5,737,967 A * | 4/1998 | Hartley | ............. | B62K 21/16 74/551.1 |
| 5,829,316 A * | 11/1998 | Krizman, Jr. | ........... | B62K 21/12 74/551.1 |
| 5,842,385 A * | 12/1998 | Su | ........... | B62K 21/16 280/279 |
| 5,881,606 A * | 3/1999 | Roddy | ............. | B62K 21/12 280/279 |
| 5,983,747 A * | 11/1999 | Chen | ............. | B62K 21/125 16/110.1 |

(Continued)

FOREIGN PATENT DOCUMENTS

DE    -102011111092    * 4/2012
FR    1063818    5/1954

*Primary Examiner* — Kevin Hurley
*Assistant Examiner* — Gabriela C Craciun
(74) *Attorney, Agent, or Firm* — Frank Marino (57) ABSTRACT

A bicycle handlebar/stem/steering tube assembly has a handle bar diameter and a steering tube diameter therewithin. One or both of the steering tube and the handlebar includes one of a depression, a diameter-reduction, and a through-hole configured to mate rigidly against the other of the steering tube and the handlebar and be affixed thereto by the stem at a handlebar/steering tube interface such that a stem offset is created of a dimension that is less than either the handlebar diameter and the steering tube diameter at the handlebar/steering tube interface.

17 Claims, 6 Drawing Sheets

(56) References Cited

U.S. PATENT DOCUMENTS

| | | | | |
|---|---|---|---|---|
| 6,003,405 | A * | 12/1999 | Giard | B62K 21/125 |
| | | | | 74/551.3 |
| 6,122,991 | A * | 9/2000 | Clarkson | B62K 11/14 |
| | | | | 74/551.1 |
| 6,244,131 | B1 * | 6/2001 | Liao | B62K 21/12 |
| | | | | 74/551.1 |
| 6,467,372 | B2 * | 10/2002 | Klieber | B62K 21/16 |
| | | | | 74/551.1 |
| 6,920,806 | B2 | 7/2005 | Cutsforth | |
| 7,131,350 | B2 * | 11/2006 | McColligan | B62K 21/12 |
| | | | | 403/290 |
| D613,651 | S * | 4/2010 | Gisbert | D12/178 |
| 7,744,108 | B2 * | 6/2010 | Nicol | B62K 21/12 |
| | | | | 280/274 |
| 8,215,203 | B1 * | 7/2012 | Swift | B62K 21/16 |
| | | | | 403/322.4 |
| 8,230,758 | B1 * | 7/2012 | Eddy | B62K 21/16 |
| | | | | 74/551.1 |
| 8,438,946 | B2 | 5/2013 | Giroux | |
| 8,490,998 | B1 * | 7/2013 | Stevens | B62K 21/12 |
| | | | | 180/336 |
| 2003/0226420 | A1 | 12/2003 | Oi et al. | |
| 2005/0263980 | A1 | 12/2005 | Bakhtin | |
| 2008/0284126 | A1 * | 11/2008 | Smith | B62K 21/12 |
| | | | | 280/264 |
| 2015/0035257 | A1 * | 2/2015 | Zaid | B62K 3/002 |
| | | | | 280/641 |

* cited by examiner

BICYCLE HANDLEBAR, STEM, AND FORK ARRANGEMENT

RELATED APPLICATIONS

This application is a Continuation and Formalization of, and claims full priority to, U.S. Provisional App No. 62/009,355, filed on 9 Jun. 2014. This application is also a Continuation-in-Part and Formalization of, and claims all entitled priority to, U.S. Provisional App No. 61/971,065, filed on 27 Mar. 2014. The entire teaching of both is incorporated herein by reference in their entireties.

FIELD OF THE INVENTION

The invention is related to bicycles. More specifically, the invention is related to bicycle handlebars and steering. Even more specifically, the invention is related to the relationship of the handlebar, head tube, heat set, fork, and stem of a bicycle. In particular, the invention improves the positionability of the handlebar relative to the rider and the head tube assembly to thereby optimize steering, improves the proper assembly of the handlebar, strengthens the assembly of the handlebar, stem, and fork of the bicycle, and optimizes bicycle steering control.

BACKGROUND

Figure 1:
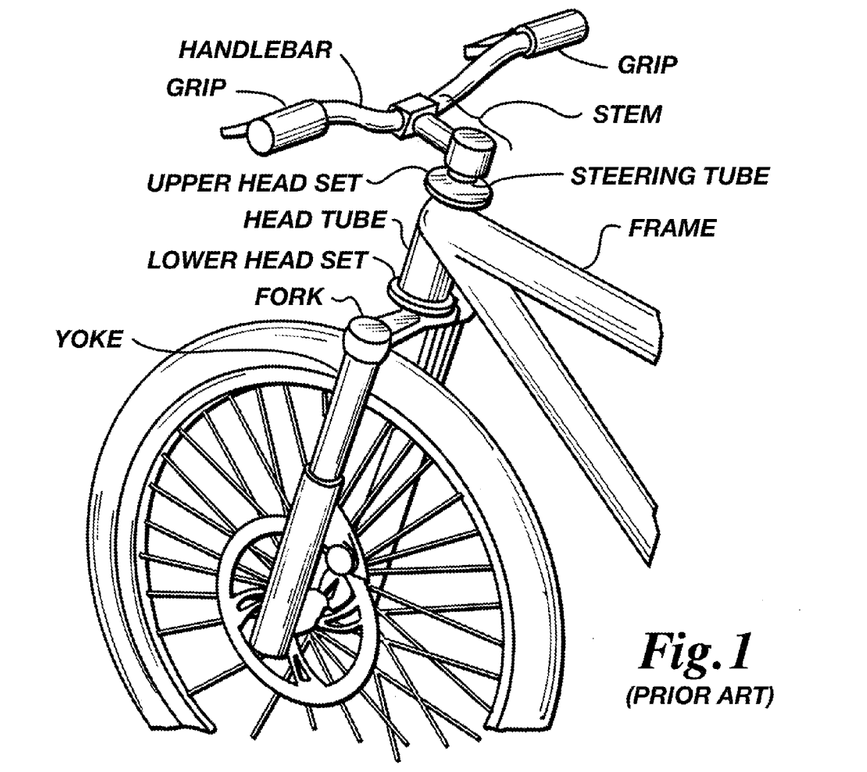
FIG. 1 is a perspective view of the forward end of a traditional prior art bicycle.

Reference is first made to FIG. 1 where a handlebar/stem/head tube/head set/fork portion of a somewhat traditional prior art bicycle is shown to provide a foundation for the terminology used herein and to provide an understanding of the state of the art leading into the present invention. Each major element is identified to familiarize with common components. It can be seen that the frame of the bicycle includes a head tube assembly at its forward-most end. The head tube assembly includes the head tube, the upper and lower head sets, and the fork including its steering tube. The head tube is slightly tilted from vertical, but to satisfy the needs of this description will be referred to as "vertical". Readers should understand that "vertical" as used herein is meant to convey "substantially vertical", and "horizontal" as used herein is meant to convey "substantially horizontal". The head tube assembly includes two sets of internal ball bearings; the upper head set adjacent the top of the head tube and the lower head set at the base of the head tube.

The fork includes a downwardly extending yoke for rotationally receiving the bicycle's front wheel. The yoke is integrally and rigidly formed with the steering tube, together forming the fork. The steering tube projects vertically upwardly and extends through the head tube, and is held by the head tube through the upper and lower head sets so that the fork is rotational relative to the head tube and frame about the vertical center axis of the steering tube. The uppermost end of the steering tube protrudes above the head tube.

The horizontally disposed handlebar is engaged to the uppermost end of the steering tube by the stem, which includes a horizontal hole for receiving the handlebar and a vertical hole for receiving the upper end of the steering tube. When properly affixed, the handlebar, stem, and fork become a single rigid member which is side-to-side rotational relative to the head tube and frame about the vertical center axis of the steering tube to effect steering of the bicycle.

Handlebars have long been available in numerous shapes to optimally position the grips at the outer ends, which the rider grasps during riding. While the traditional bicycle of FIG. 1 shows a traditional stem that positions the handlebar several inches forward of the steering tube, handlebars have long been available for positioning the grips, in both height and forward-backward position, wherever is most comfortable for the rider. But recent efforts have found that grip position alone is not sufficient to optimize steering control. Control is now realized to be optimized as the distance between the handlebar and the steering tube (Stem Offset), and the proximity of the handlebar to the head tube (Stem Height) is decreased.

In response to these findings, stems are recently available in numerous configurations to attempt to minimize Stem Offset and Stem Height. Stems are now available which can position the centerline of the handlebar as close as 35 MM from the centerline of the steering tube at minimum Stem Height, or stems are now available which can position the centerline of the handlebar as close as 10 MM from the centerline of the steering tube when Stem Height is sacrificed. But to date, no arrangement is available for minimizing both Stem Offset and Stem Height.

SUMMARY OF THE INVENTION

The invention may be practiced by or using a fork, stem, and handlebar arrangement for a bicycle which allows the handlebar to be positioned lower relative to the bicycle head tube assembly and closer to the head tube assembly's rotational axis than previously possible, and that provides an interface between the handlebar, stem, and fork which strengthens the assembly thereof and automatically disposes the handlebar in a precisely centered position.

The invention may be embodied in or practiced using a bicycle handlebar/stem/steering tube assembly having a handle bar diameter and a steering tube diameter therewithin, wherein one or both of the steering tube and the handlebar includes one of a depression, a diameter-reduction, and a through-hole configured to mate rigidly against the other of the steering tube and the handlebar and be affixed thereto by the stem at a handlebar/steering tube interface such that a stem offset is created of a dimension that is less than either the handlebar diameter and the steering tube diameter at the handlebar/steering tube interface.

The invention may also be embodied in or practiced using bicycle handlebar having a handle bar diameter and including one of a depression, a diameter-reduction, and a through-hole configured to mate rigidly against a bicycle steering tube having a steering tube diameter, and to be affixed thereto by a stem at a handlebar/steering tube interface such that a stem offset is created of a dimension that is less than either the handlebar diameter and the steering tube diameter at the handlebar/steering tube interface.

The invention may also be embodied in or practiced using bicycle steering tube having a steering tube diameter and including one of a depression, a diameter-reduction, and a through-hole configured to mate rigidly against a handlebar having a handlebar diameter, and to be affixed thereto by the stem at a handlebar/steering tube interface such that a stem offset is created of a dimension that is less than either the handlebar diameter and the steering tube diameter at the handlebar/steering tube interface.

The invention may also be embodied in or practiced using a bicycle stem including a vertical steering tube hole having a steering tube hole diameter and steering tube hole axis, and having a horizontal handlebar hole having a handlebar hole diameter and handlebar hole axis, wherein the steering tube hole axis and the handlebar hole axis are separated by a dimension that is smaller than the steering tube hole diameter and smaller than the handlebar hole diameter.

Further features and aspects of the invention are disclosed with more specificity in the Detailed Description and Drawings provided herein and showing exemplary embodiments of the invention.

BRIEF DESCRIPTION OF THE DRAWINGS

Prior art and exemplary embodiments of a bicycle handlebar, stem, and fork arrangement in accordance with or useful in practicing the invention are shown in the accompanying Drawings, of which.

DETAILED DESCRIPTION OF EXEMPLARY EMBODIMENTS

As appreciated by review of the included photos and drawings, the invention may be embodied in or practiced using various bicycle handlebar and stem combinations. While the disclosed embodiments serve to minimize the Stem Offset and Stem Height when used with unaltered prior art steering tubes, it is an intended aspect of the invention that customized steering tubes may be employed to even further minimize the Stem Offset and Stem Height.

Figure 2:
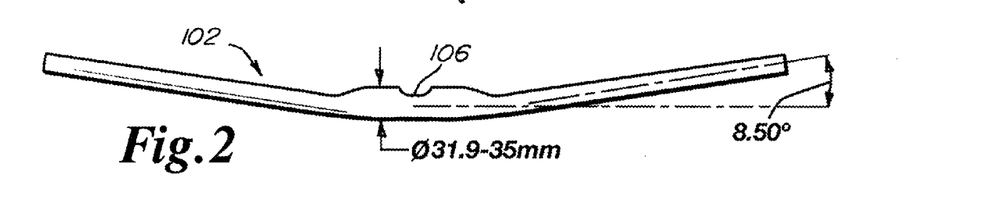
FIG. 2 is a top view of a first bicycle handlebar.
Figure 3:
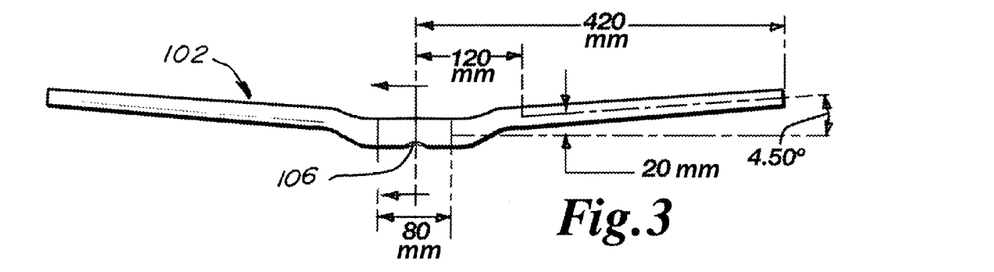
FIG. 3 is a front view of the handlebar of FIG. 2.
Figure 4:
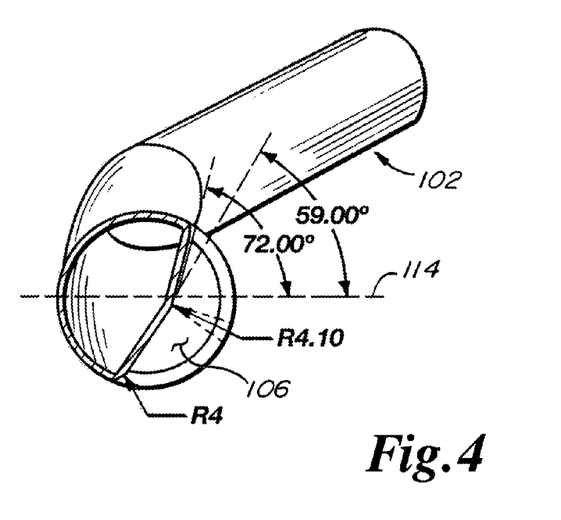
FIG. 4 is a cross section through the handlebar of FIG. 2.
Figure 5:
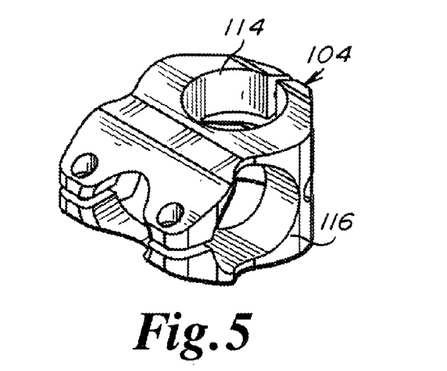
FIG. 5 is a perspective view of a first bicycle stem.
Figure 6:
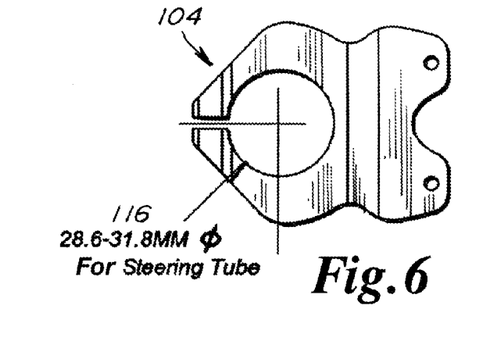
FIG. 6 is a top view of the stem of FIG. 5.
Figure 7:
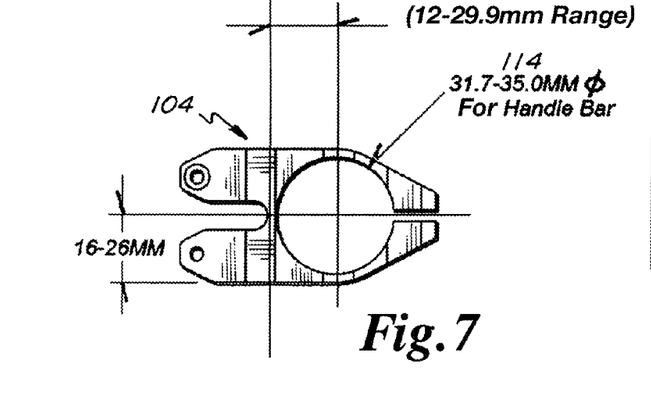
FIG. 7 is a side view of the stem of FIG. 5.
Figure 8:
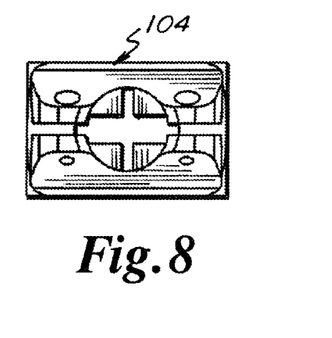
FIG. 8 is a front end view of the stem of FIG. 5.

Referring to FIGS. 2 through 13, an assembly 100 of a handlebar 102 and a stem 104 according to a first exemplary embodiment is shown. This assembly minimizes Stem Offset by allowing the handlebar to move rearwardly closer to the steering tube versus prior art configurations. This is accomplished in part by a semicircular depression 106 formed into the longitudinal center of the handle bar, as best seen in FIGS. 2, 3, and 4. This depression has a radius which matches the diameter of a traditional steering tube 108 of a traditional bicycle 110, allowing that the handlebar diameter 111 and steering tube diameter may effectively overlap each other.

The stem includes a clampable steering tube hole 114 and a clampable handlebar hole 116, to receive steering tube 108 and handlebar 102 respectively, where-after handlebar clamping screws 118 and steering tube clamping screws 118S are tightened to secure assembly 100 rigidly together. The centerlines of holes 114 and 116 may be separated from say 12 MM to 29.9 MM to create an equal Stem Offset. As exemplified in FIG. 13, while the traditional steering tube may have a diameter of say 30 MM and the longitudinal center portion of the handlebar may have a diameter of say 35 MM, the Stem Offset may be say only 20 MM.

And while the primary goal of assembly 100 is to reduce Stem Offset, the interface between the handlebar and steering tube also reduces or eliminates inadvertent handlebar rotation and eliminates inadvertent handlebar side-to-side slippage. Referring to FIG. 4, while the shown handle bar includes a non-continuous depression fifty-nine degrees from horizontal below the centerline 114 and seventy-two degrees from horizontal above the centerline, to thereby allow pre-tightening rotational adjustment of the handlebar thirteen angular degrees according to rider preference, those angles are merely exemplary and could instead by any practical alternative. Or the depression could be continuous at say fifty-nine degrees, seventy-two degrees, or any practical alternative. With such a continuous depression, any inadvertent handlebar rotation is eliminated because the relationship between the handlebar and steering tub is rigidly fixed.

The overall handlebar shape used in such an assembly as above may alternatively be almost any known or future shape, such as a typical "flat" handlebar shape or a typical "riser" handlebar shape. And it should be appreciated that handlebars with such depressions for use in such a new assembly may still be used with common prior art stems. For instance, referring to FIG. 2 it can be seen that the cylindrical central portion of the handlebar may be, among other diameters, say 31.9 to 35 MM, to correspond to industry standards. This handlebar may thereby be used with other common prior art stems with no sacrifice in functionality. But when used with stem 104, and properly centered so that the semicircular depression aligns with the steering tube hole of the stem, the axis of the handlebar, which may for instance have a 35 MM central diameter, may be disposed say 20 MM or less forward of (or behind) the axis of the steering tube, which may for instance have say a 31.8 MM diameter.

Figures 9, 12, 13:
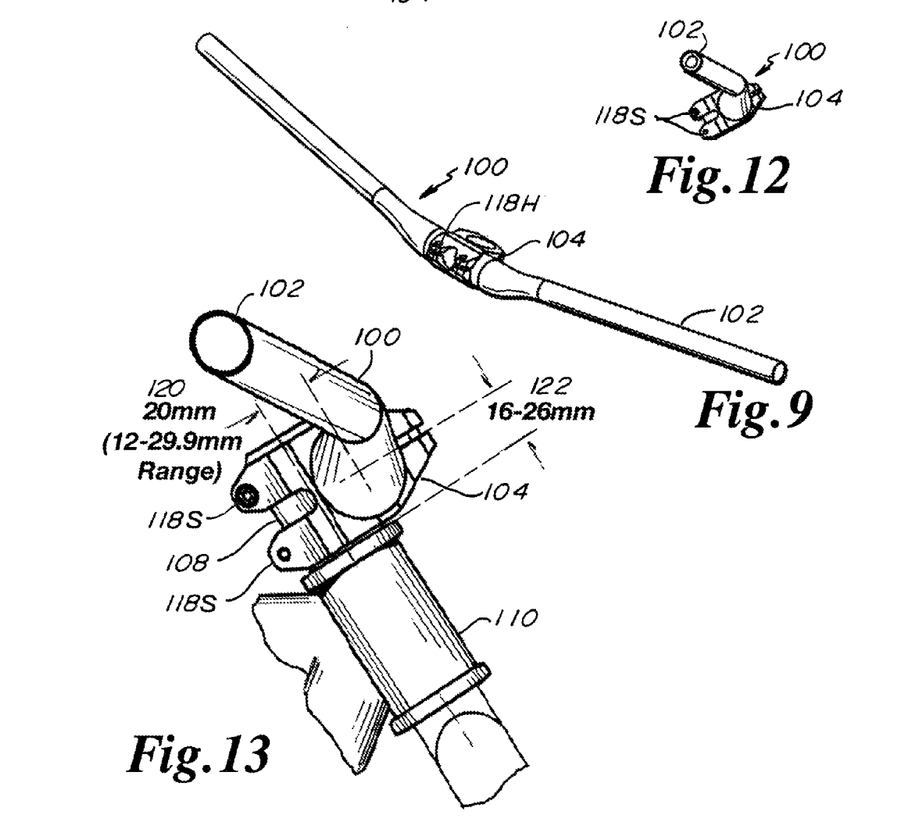
FIG. 9 is a perspective view of an assembly of the handlebar of FIG. 2 with the stem of FIG. 5.
FIG. 12 is a side view of the assembly of FIG. 9.
FIG. 13 is a side view of the assembly of FIG. 9 to the steering tube of a bicycle.
Figure 10:
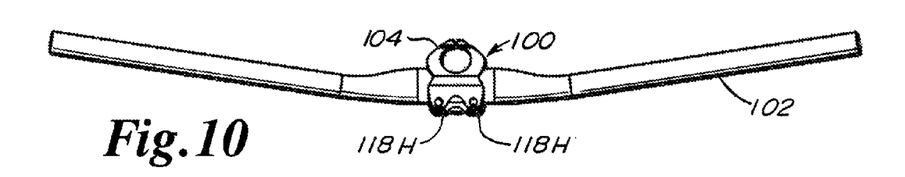
FIG. 10 is a top view of the assembly of FIG. 9.
Figure 11:
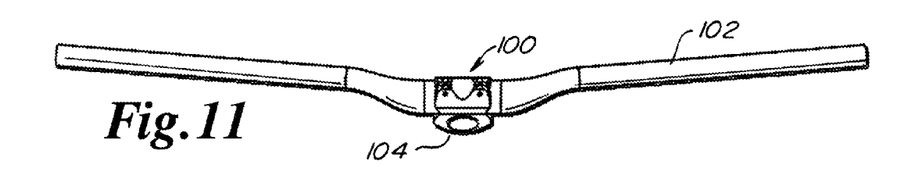
FIG. 11 is a front view of the assembly of FIG. 9.

As seen in FIG. 13, the Stem Offset 120 in the above arrangement would therefore be only 20 MM while both the handlebar and steering tube diameters exceeded 20 MM. And this is accomplished while achieving a Stem Height 122 of only 16-26 MM (depending on the actual handlebar diameter).

Without the semicircular depression, it can be appreciated that the minimum Stem Offset that could be achieved (without sacrificing Stem Height) would be half of the handlebar diameter (say 17.5 MM for a 35 MM diameter handlebar) plus half of the steering tube diameter (say 15.9 MM for a 31.8 MM steering tube)=33.4 MM. It can also be appreciated that the Stem Height would be limited to only 22 MM when using a 35 MM diameter handlebar.

The Stem Offset that could be achieved (without sacrificing Stem Height) when using a 31.8 MM diameter handlebar and a 28.6 MM diameter steering tube would be 15.9 MM+14.3 MM=30.2 MM, and the Stem Height would be only 19 MM.

With a prior art handlebar without the semicircular depression, the only way to obtain a Stem Offset less than 33.4 MM for such a handlebar/steering tube combination would be to less-desirably position the handlebar above the steering tube, thereby sacrificing steering control.

It should also be appreciated that the semicircular depression is configured to engage the steering tube and structurally cooperate therewith by wrapping partially there-around to greatly improve the direct interface between those two components in a way that increases rigidity and strength of the assembly. No longer is the connection of the handlebar and steering tube made only through the stem as in the prior art, but is now made directly, in addition to the reinforcement still provided by the stem. Even if the handlebar clamping screws 118H become slightly loosened, the handlebar cannot be further rotated or pulled from the stem, providing a significant safety advantage over the prior art.

And because the semicircular depression is precisely formed at the longitudinal center of the handlebar, proper and precise centering of the handlebar to the steering tube and within the stem is simplified and ensured, additionally improving steering control and balance.

The invention also anticipates numerous other configurations for obtaining a reduced Stem Offset without sacrificing minimal Stem Height. In the following described alternatives, the related figures employ similar numbering as used for the first assembly, except that the first digit of each item number corresponds to the embodiment number. For instance, where the first assembly was assigned item number "100" and the first handlebar was assigned item number "102", the third assembly is assigned item number "300" and the third handlebar is assigned item number "302".

Figures 14, 15:
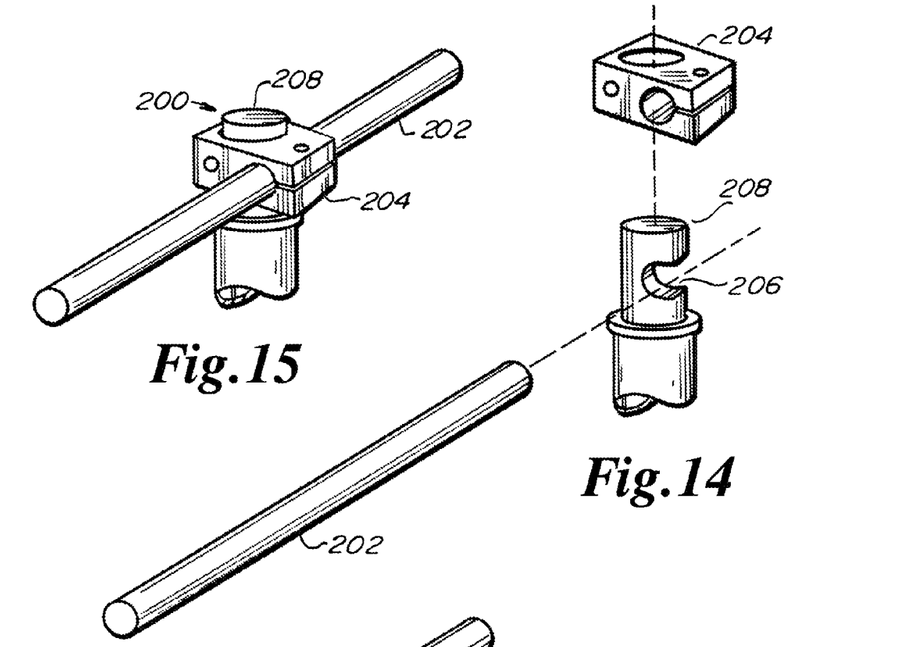
FIG. 14 is an exploded perspective view of a second steering tube, second stem, and second handlebar.
FIG. 15 is a perspective view of an assembly of the steering tube, stem, and handlebar of FIG. 14.

As seen in a second assembly 200 shown in FIGS. 14 and 15, a depression 206 or an equivalent slot could alternatively be formed into the steering tube 208. An advantage of this embodiment is that prior art handlebars 202 may be used in an equivalently minimized Stem Offset arrangement using indented stem 204. Such an arrangement would include the structurally advantageous interface of the handlebar directly with the stem and the equivalent advantage in minimizing Stem Offset, but instead of requiring use of a new handlebar with an existing stem would require use of a new stem with an existing handlebar. And of course, as in the previous embodiments, this version would be "backwards compatible" in that it would be useable with existing stem/handlebar combinations as well.

The invention also anticipates that mating depressions could be formed in both the handlebar and steering tube, and that the depressions could be some mating shapes other than a semicircular depression against a circular tube. For instance, one of the handlebar and steering tube could have a flattened portion engaging a flattened portion of the other.

Figures 16, 17:
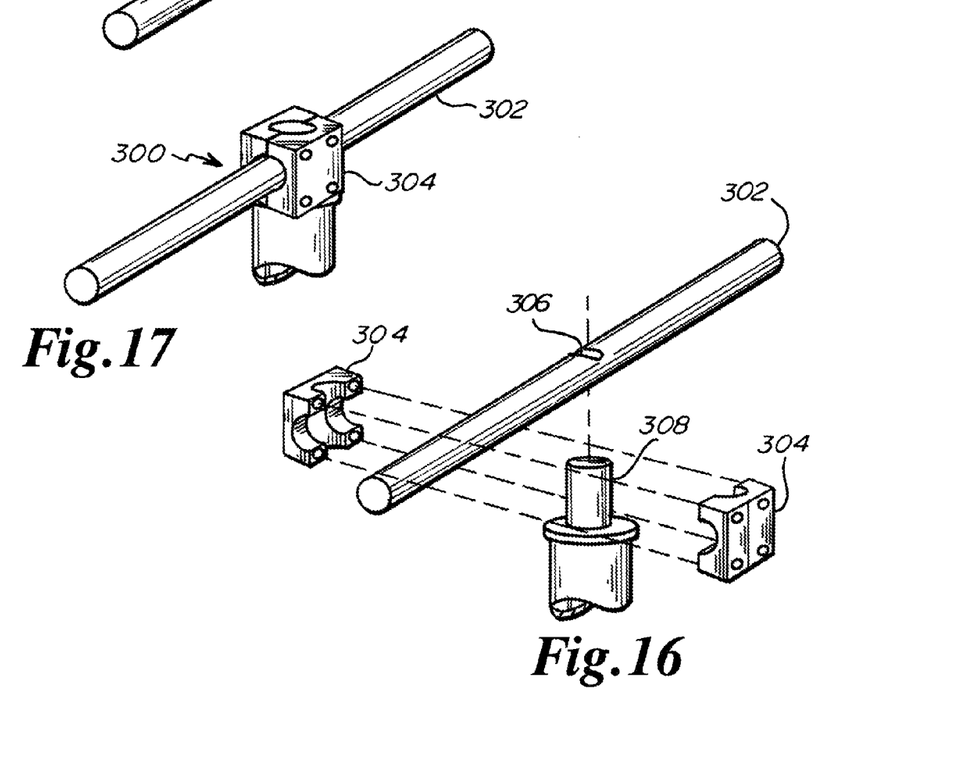
FIG. 16 is an exploded perspective view of a third steering tube, third stem, and third handlebar.
FIG. 17 is a perspective view of an assembly of the steering tube, stem, and handlebar of FIG. 16.
Figures 18, 19:
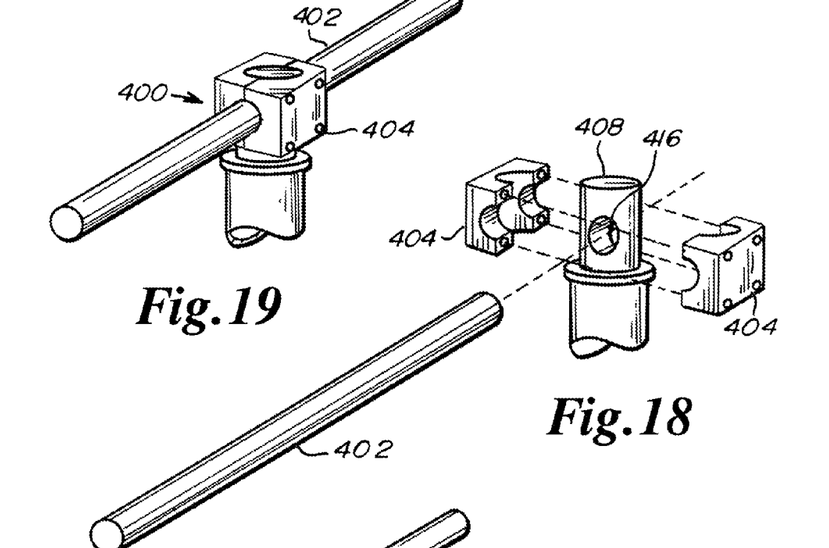
FIG. 18 is an exploded perspective view of a fourth steering tube, fourth stem, and fourth handlebar.
FIG. 19 is a perspective view of an assembly of the steering tube, stem, and handlebar of FIG. 18.
Figures 20, 21, 22, 23:
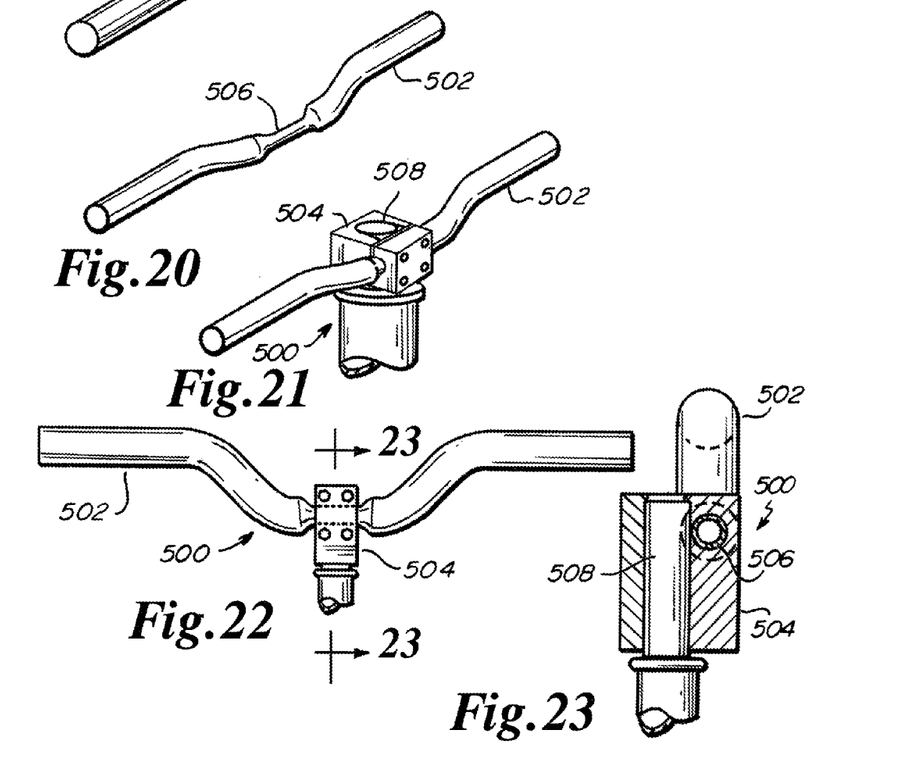
FIG. 20 is a perspective view of a fifth handlebar.
FIG. 21 is a perspective view of a fifth assembly including the handlebar of FIG. 20 with a bicycle and a fifth stem.
FIG. 22 is a front view of the assembly of FIG. 20.
FIG. 23 is a cross-sectional view of the assembly of FIG. 20.

FIGS. 16 and 17 show a third assembly 300, wherein a vertical through-hole 306 is formed in the handlebar to reduce Stem Offset to as little as 0 MM without sacrificing Stem Height. Alternatively, FIGS. 18 and 19 show an equivalent horizontal through-hole 406 formed through steering tube 408 in a fourth assembly 400. Again, this allows either the use of existing prior art steering tubes (third assembly) or existing prior art handlebars (fourth assembly).

Figures 24, 25, 26, 27, 28:
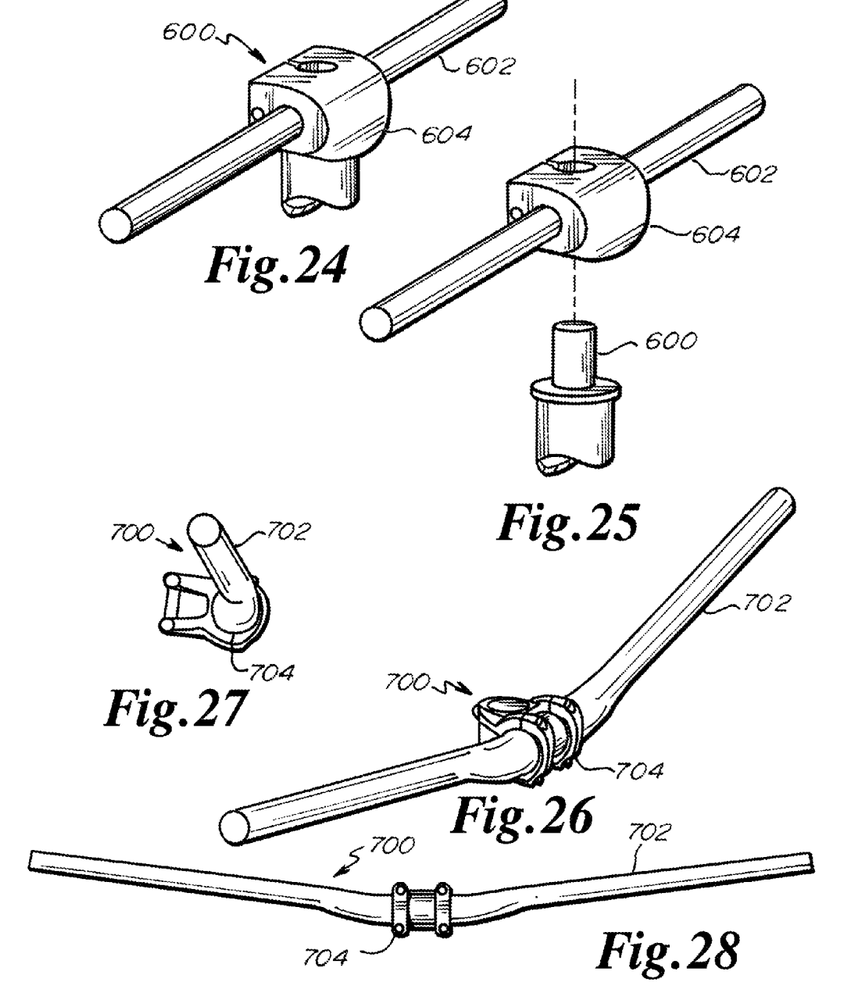
FIG. 24 is a perspective view of a sixth steering tube/stem/handlebar assembly.
FIG. 25 is an exploded view of the assembly of FIG. 24.
FIG. 26 is a perspective view of a seventh stem/handlebar assembly.
FIG. 27 is a side view of the assembly of FIG. 26.
FIG. 28 is a front view of the assembly of FIG. 26.
Figure 29:
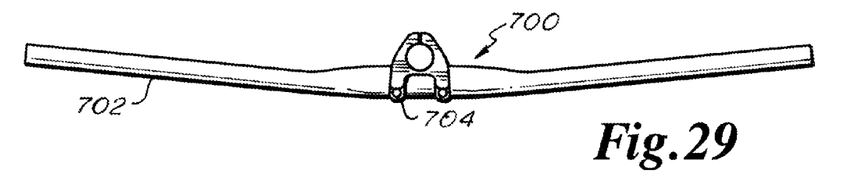
FIG. 29 is a top view of the assembly of FIG. 26.

In FIGS. 20 through 23, a fifth assembly 500 is shown wherein the central portion of handlebar 502 is necked down to a smaller diameter so that the centerline of the handlebar at that point may be closer to the centerline of typical steering tube 508, allowing a Stem Offset that is smaller than the diameter the steering tube or the diameter of the remainder of the handlebar FIGS. 24 and 25 show a sixth assembly 600 having a stem 604 and a handlebar 602 integrally formed such that the axis of the handlebar may be as close as collinear with the axis of typical steering tube 608 (a 0 MM Stem Offset). The handlebar and stem may be a welded assembly, or may be integrally molded or cast.

FIGS. 26 through 29 show a seventh assembly 700, similar in most respects except design to the Assembly 100 of FIGS. 10 through 13.

While the invention has been shown and described with reference to specific exemplary embodiments, it should be understood by those skilled in the art that various changes in form and detail may be made without departing from the spirit and scope of the invention, and that the invention should therefore only be limited according to the following claims, including all equivalent interpretation to which they are entitled.

I claim:

1. An assembly of a bicycle handle bar, stem, and steering tube, having a handle bar diameter and a steering tube diameter there-within; wherein one of the steering tube and the handlebar comprises one of a depression, a diameter-reduction, and a through-hole configured to mate rigidly against another of the steering tube and the handlebar, and be affixed thereto by the stem at an interface of the handlebar and the steering tube, wherein the one of a depression, a diameter reduction, and a through-hole enables a stem offset that is of a dimension that is less than the handlebar diameter at the handlebar/steering tube interface, and less than the steering tube diameter at the handlebar/steering tube interface.

2. The assembly of claim 1 wherein the one of the steering tube and the handlebar is the steering tube.

3. The assembly of claim 2 wherein the one of a depression, a diameter-reduction, and a through-hole is a depression.

4. The assembly of claim 2 wherein the one of a depression, a diameter-reduction, and a through-hole is a circular through-hole.

5. The assembly of claim 1 wherein the one of the steering tube and the handlebar is the handlebar.

6. The assembly of claim 5 wherein the one of a depression, a diameter-reduction, and a through-hole is a depression.

7. The assembly of claim 5 wherein the one of a depression, a diameter-reduction, and a through-hole is a circular through-hole.

8. The assembly of claim 1 wherein the one of the steering tube and the handlebar is both.

9. The assembly of claim 8 wherein the one of a depression, a diameter-reduction, and a through-hole is a depression.

10. A bicycle handlebar having a handle bar diameter and comprising one of a depression, a diameter-reduction, and a through-hole configured to mate rigidly against a bicycle steering tube having a steering tube diameter; and to be affixed thereto by a stem at an interface of the handlebar and the steering tube such that the one of a depression, a diameter-reduction, and a through-hole enables a stem offset of a dimension that is less than either the handlebar diameter and the steering tube diameter at the interface.

11. The handlebar of claim 10 wherein the one of a depression, a diameter-reduction, and a through-hole is a depression.

12. The handlebar of claim 10 wherein the one of a depression, a diameter-reduction, and a through-hole is a circular through hole.

13. The handlebar of claim 12 wherein the circular through hole is a vertical circular through-hole.

14. A bicycle steering tube having a steering tube diameter and comprising one of a depression, a diameter-reduction, and a through-hole configured to mate rigidly against a handlebar having a handlebar diameter; and to be affixed thereto by the stem at an interface of the handlebar and the steering tube such that the one of a depression, a diameter-reduction, and a through-hole enables a stem offset of a dimension that is less than either the handlebar diameter and the steering tube diameter at the interface.

15. The steering tube of claim 14 wherein the one of a depression, a diameter-reduction, and a through-hole is a depression.

16. The steering tube of claim 14 wherein the one of a depression, a diameter-reduction, and a through-hole is a circular through hole.

17. The steering tube of claim 16 wherein the circular through hole is a horizontal circular through-hole.

\* \* \* \* \*